United States Patent [19]
Davis et al.

[11] 3,955,431
[45] May 11, 1976

[54] VALVE ACTUATOR MECHANISM

[75] Inventors: Alan C. Davis, Concord; Domenic Di Persio, Lexington, both of Mass.

[73] Assignee: Beatrice Foods Company, Chicago, Ill.

[22] Filed: Sept. 23, 1974

[21] Appl. No.: 508,402

[52] U.S. Cl. ............................................. 74/100 R
[51] Int. Cl.² ........................................ F16H 21/54
[58] Field of Search ........................... 74/100, 106

[56] References Cited
UNITED STATES PATENTS

| | | | |
|---|---|---|---|
| 809,693 | 1/1906 | Johnston | 74/100 X |
| 1,477,647 | 12/1923 | Hook | 74/100 |
| 2,576,771 | 11/1951 | Bentley | 74/100 |
| 2,936,011 | 5/1960 | O'Leary | 74/106 |
| 3,321,983 | 5/1967 | Stevens | 74/100 |

Primary Examiner—Samuel Scott
Assistant Examiner—Wesley S. Ratliff, Jr.
Attorney, Agent, or Firm—Robert T. Gammons

[57] ABSTRACT

A valve actuator comprising a toggle mechanism and push rod operable to effect opening and closing of the valve by repeatedly pushing the push rod.

2 Claims, 10 Drawing Figures

VALVE ACTUATOR MECHANISM

BACKGROUND OF INVENTION

A toggle mechanism providing for a so-called push button type of operation in which repeated pushing produces the movement desired is old in the art as shown, for example, in U.S. Pat. Nos. 2,565,873, 2,946,237 and 3,359,397. The device of this invention is considered to be an improvement over that shown in any of the aforesaid patents in its simplicity and its adaptability to the particular application for which it is designed.

SUMMARY OF INVENTION

As herein illustrated, the actuator is designed for opening and closing a rotary valve provided with a spindle for effecting its rotation and comprises a rotor fixed to the spindle for rotation in a plane perpendicular to its axis, means on the rotor symmetrically arranged at equal radical distances from said axis, a transfer arm, means pivotally supporting the transfer arm at one end with its other end adjacent said axis for movement from side to side to a position opposite one of said symmetrically arranged means on the rotor, said transfer arm being operable by movement into engagement with one of said means at one side to rotate the rotor to the other side and means operable when the transfer arm is withdrawn from engagement with said one of said means to move it to the other side to a position opposite the other of said means. The means for effecting transfer of the transfer arm from one side to the other comprises a spring connected to one end to the distal end of the arm and at its other end to a pin on the rotor located at a radial distance from the axis of rotation thereof and symmetrically with respect to the first named means. The transfer arm is pivotally supported at one end with its distal end adjacent said axis of rotation and there is means supporting the transfer arm for linear movement toward and from the axis of rotation comprising a push rod to one end of which the arm is pivotally connected and a spring which normally holds the push rod retracted so that the distal end of the transfer arm is spaced from said first means. The distal end of the transfer arm contains a concave recess for engagement with said first named means which comprise pins in the form of abutments on the rotor, the recess retaining the pin with which it is engaged as the rotor is rotated from one side to the other. The width of the transfer arm at its distal end corresponds approximately to the distance between the pins and the spring connecting the distal end of the arm to the rotor supports, the distal end of the arm offset with respect to the axis of the push rod and the rotor so that in the neutral position of the rotor wherein the pins are symmetrically disposed with respect to the axis of the push rod movement of the transfer arm will cause that side of the transfer arm which is biased with respect to the axis of rotation of the rotor into engagement with the pin at that side.

The rotary valve is of the ball type containing a diametrical passage and the spindle by means of which it is rotated is fixed to the ball at right angles to the axis of the passage through the ball.

The invention will now be described with reference to the accompanying drawings wherein.

Figures 1, 2, 3:
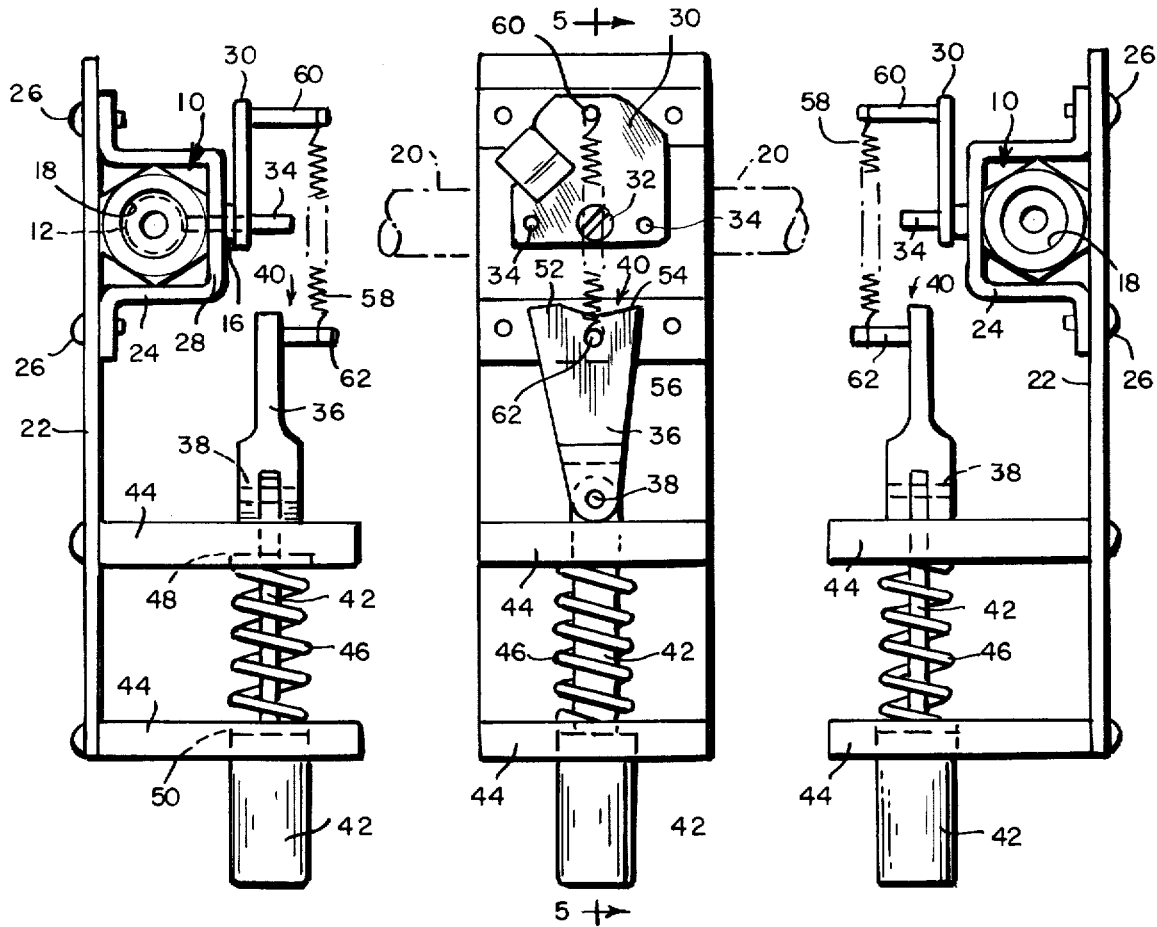
FIG. 1 is an elevation of the actuator in a neutral position.
FIG. 2 is an elevation taken from the left side of FIG. 1.
FIG. 3 is an elevation taken from the right side of FIG. 1.
Figure 4:
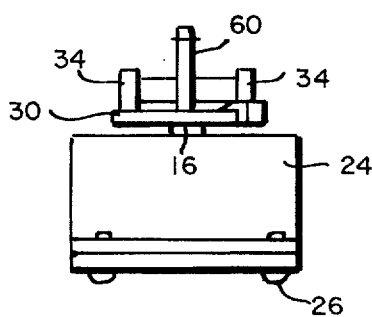
FIG. 4 is the top view.
Figure 5:
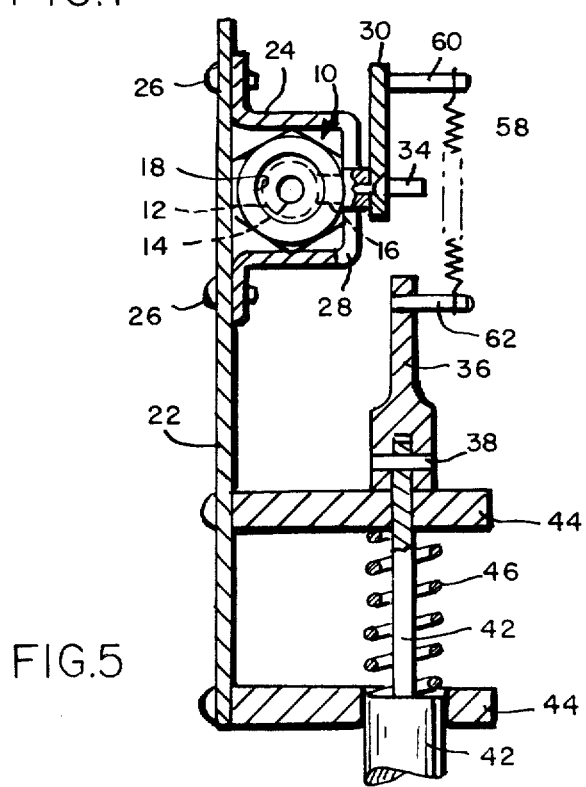
FIG. 5 is a vertical section taken on the line 5—5 of FIG. 1.
Figure 6:
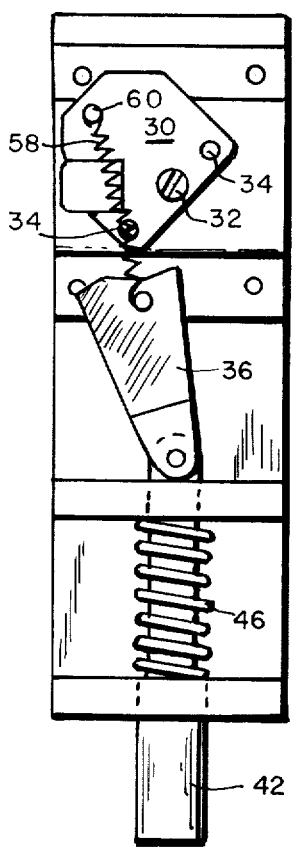

FIGS. 6, 7, 8, 9 and 10 taken in an open position with the transfer arm fully retracted; in partly closed positions; in a fully closed position with the transfer arm still engaged; in a closed position with the transfer arm fully retracted and in a position about to be opened.

The actuator is a push button type of device designed to enable opening and closing a valve or other switch element by the simple expedient of repeatedly pushing a push rod. Its specific application is to open and close a ball valve in a water conductor for supplying water to a service station such as commonly employed in hospitals, schools, institutions and the like where the attendants may be otherwise encumbered and this device provides a convenient means for knee operation which enables either turning off or turning on the water supply by the simple expedient of pressing the knee against a push rod.

Referring specifically to FIGS. 1 to 5 inclusive, there is shown a valve housing 10 in which there is rotatably mounted a ball valve 12 containing a diametrical passage 14. The ball has on it a stem or spindle 16 the axis of which is perpendicular to the axis of the passage 14 which protrudes through the side of the housing by means of which the ball may be rotated from a position in which the passage 12 is aligned with the axis of the housing to permit flow or to a diametrically disposed position in which its blocks the flow. The housing at opposite sides of the valve is threaded at 18—18 for connecting it to conductors diagramatically illustrated at 20—20, one of which may be from a source of water supply and the other of which leads to a dispensing cock.

The device for effecting rotation of the ball valve is mounted on the valve housing by means of a rigid supporting plate 22 and a U-shaped clamp 24 which fits about the valve housing and is fastened to the plate by screw 26. The U-shaped clamp 24 contains an opening 28 through which the valve spindle 16 extends substantially perpendicular to the supporting plate and there is fastened to this spindle a rigid rotor 30 which is arranged to turn about the axis of the spindle in a plane perpendicular thereto. The rotor is fastened to the spindle by a screw 32. A pair of pins 34—34 are mounted on the rotor symmetrically with respect to the axis of rotation and at equal radial distances therefrom, preferably on a diameter.

An actuator in the form of a transfer arm 36 is provided for rotating the rotor from side to side of its axis of rotation by engagement first with one of the pins 34 and then the other. The transfer arm 36 is pivotally supported at one end on a pivot pin 38 with its distal end 40 adjacent the pivot axis of the rotor on one end of a push rod 42. The push rod is slidably mounted in a pair of supports 44—44 mounted on the plate 22 for axial movement on a line passing through the axis of the rotor. A spring 46 mounted on the push rod between the supports 44—44 with one end bearing upon a shoulder 48 on the upper one of the supports 44 and the other on a shoulder 50 on the push rod holds the transfer arm in a retracted position. The transfer arm has at its distal end a flat surface 52 at one side, a prong 54 at the opposite side and intermediate the flat surface and prong a concave surface 56. The width of the distal end of the transfer arm is such that when it is moved upwardly towards the rotor and when the latter is in its neutral position as shown in FIG. 1, the flat surface 52 will engage the pin 34 at that side and as the push rod continues to be moved deflect the transfer arm toward the left about its pivoted end until the bottom of the concave portion 56 becomes fully engaged with the pin at that side whereupon further movement will rotate the rotor in a clockwise direction about its axis.

A coiled spring 58 is connected at one end to a pin 60 on the rotor which is located at a radial distance from the axis of rotation and symmetrically with respect to the pins 34—34 and at its other end non-symmetrically with respect to the center line of the transfer arm to a pin 62 and this spring holds the transfer arm just off center when the rotor is in its neutral position as referred to above so that the flat portion at the distal end of the transfer arm will engage the pin 34 at the left and the prong at the right side will be drawn away from the pin 34 at the right side. The spring 58 operates after the rotor has been rotated to the right and the push rod released to transfer the transfer arm from left to right so that its distal end is now opposite the pin 34 at the right hand side of the axis of rotation. Now, when the push rod is again advanced the distal end of the transfer arm will engage the pin 34 at the right and further movement will rotate the rotor around to the left. Again, when the push rod is withdrawn the spring will move the transfer arm across the pivot axis to the left so as to be in a position to engage the pin 34 at the left for another operation.

Figure 7:
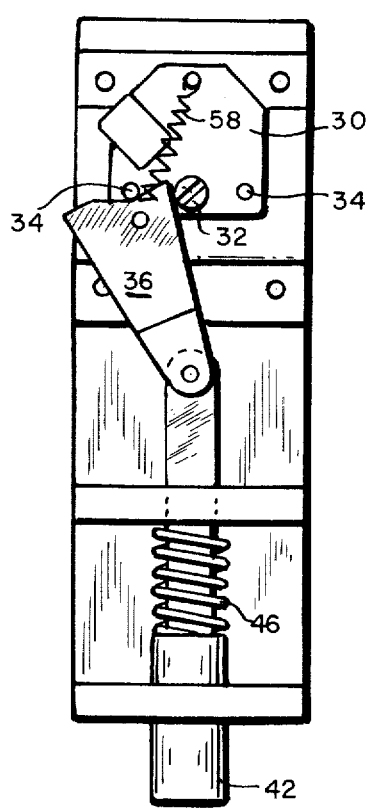
Figure 8:
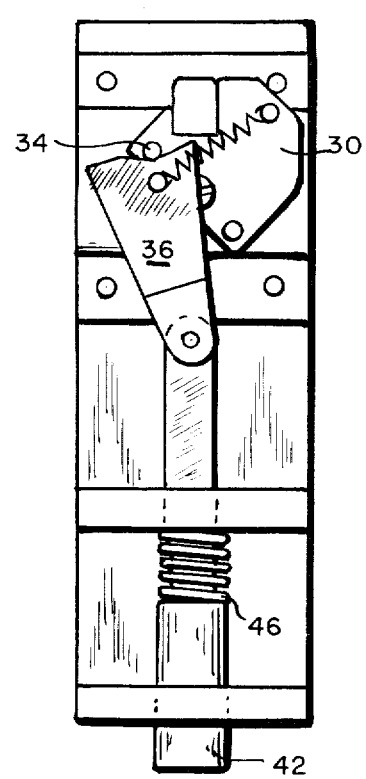
Figure 9:
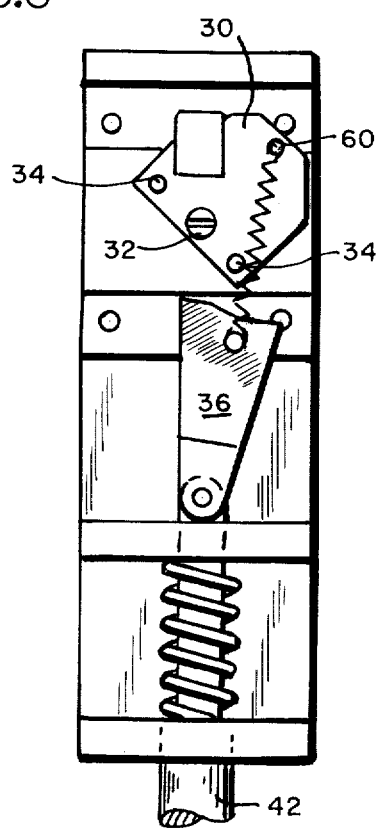
Figure 10:
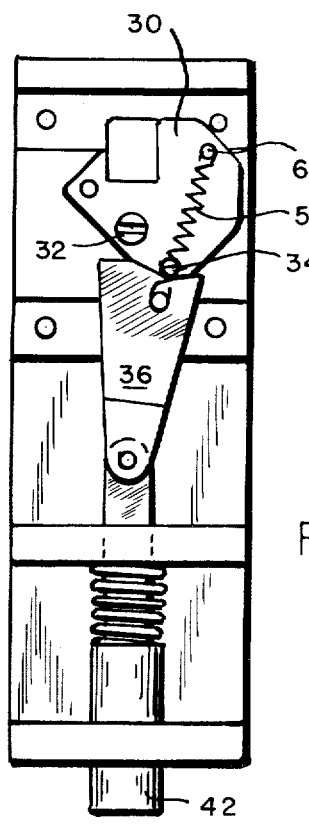

The successive positions of the device are shown in FIGS. 6, 7, 8, 9 and 10. Starting with FIG. 6, the valve is in its open position with the rotor rotated to the left to its furthest position and the transfer arm retracted. FIG. 7 shows the transfer arm engaged with the pin and the rotor rotated clockwise to partially closed position; FIG. 8 shows the push rod fully advanced so that the rotor has been rotated all the way in a clockwise direction to a closed position of the valve; FIG. 9 shows the push rod fully retracted with the valve closed and FIG. 10 shows the initial engagement of the transfer arm with the rotor preparatory to rotating the rotor counterclockwise to an open position.

The device as thus constructed is a very simple mechanical movement which enables opening and closing a valve quickly and easily with a minimum amount of effort and is readily adaptable to any kind of on-off valve mechanism.

It should be understood that the present disclosure is for the purpose of illustration only and includes all modifications or improvements which fall within the scope of the appended claims.

We claim:

1. An actuator for opening and closing a rotary valve having a rotatable valve spindle, a rotor comprising a flat plate fixed to the spindle for rotation in a plane perpendicular to the axis of the spindle, first spaced pins fixed to the plate parallel to and at equal radial distances from the axis of the spindle on a line through said axis, a third pin fixed to the plate parallel to and at a greater radial distance from the axis of the spindle than the first pins and at equal distances from said first pins, a push rod reciprocally mounted for movement toward and from the axis of the spindle along a straight line intersecting the axis of the spindle and at the opposite side of said axis of the spindle from that of the third pin, a spring yieldably holding the push rod retracted with respect to the axis of the spindle, a rigid transfer arm pivotally connected at one end to the push rod with its distal end spaced from the axis of the spindle, and a spring connecting the distal end of the transfer arm to the third pin which operates to bias the transfer arm to that side of its distal end toward which the rotor is rotated with respect to its axis of rotation, said push rod operating each time it is pushed to effect rotation of the rotor to one side or the other of the axis of the spindle.

2. An actuator according to claim 1, wherein the transfer arm has a cam surface at its distal end for engagement with and positioning of the pin with which it is engaged in a predetermined position of rotation of the rotor.

* * * * *